ced by examiner

(12) United States Patent
Godbillon et al.

(10) Patent No.: US 8,125,649 B2
(45) Date of Patent: Feb. 28, 2012

(54) SCANNING SENSOR SYSTEM FOR NONCONTACT OPTICAL SCANNING OF OBJECT SURFACES

(75) Inventors: Pascal Godbillon, Heilbronn (DE); Bernd Lutat, Birkenau (DE); Alexander Knüttel, Birkenau (DE)

(73) Assignee: Isis Sentronics GmbH, Mannheim (DE)

( * ) Notice: Subject to any disclaimer, the term of this patent is extended or adjusted under 35 U.S.C. 154(b) by 353 days.

(21) Appl. No.: 12/449,539

(22) PCT Filed: Feb. 9, 2008

(86) PCT No.: PCT/EP2008/000998
§ 371 (c)(1),
(2), (4) Date: Oct. 12, 2009

(87) PCT Pub. No.: WO2008/098716
PCT Pub. Date: Aug. 21, 2008

(65) Prior Publication Data
US 2010/0033732 A1  Feb. 11, 2010

(30) Foreign Application Priority Data
Feb. 16, 2007 (DE) .................. 10 2007 008 361

(51) Int. Cl.
*G01B 11/02* (2006.01)
(52) U.S. Cl. ...................................................... 356/497
(58) Field of Classification Search ................. 356/479, 356/497
See application file for complete search history.

(56) References Cited

U.S. PATENT DOCUMENTS

| | | | | |
|---|---|---|---|---|
| 4,963,728 | A | * | 10/1990 | Hof et al. ................. 250/227.11 |
| 6,690,963 | B2 | * | 2/2004 | Ben-Haim et al. ............ 600/424 |
| 7,170,610 | B2 | * | 1/2007 | Knuttel ........................ 356/456 |
| 2003/0218756 | A1 | * | 11/2003 | Chen et al. .................... 356/497 |
| 2010/0033732 | A1 | * | 2/2010 | Godbillon et al. ............ 356/497 |

FOREIGN PATENT DOCUMENTS

| | | |
|---|---|---|
| DE | 38 34 117 A1 | 4/1990 |
| DE | 200 08 721 U1 | 9/2000 |
| EP | 1 580 521 A2 | 9/2005 |
| WO | WO 2005/088241 A1 | 9/2005 |
| WO | WO 2007/079837 A1 | 7/2007 |

* cited by examiner

*Primary Examiner* — Patrick J Connolly
(74) *Attorney, Agent, or Firm* — Walter A. Hackler

(57) ABSTRACT

A scanning sensor system for noncontact optical scanning of object surfaces having a sensor head (2) and an optics unit (3) as system components matched to one another. The optics unit (3) can be attached and positioned with high precision on the sensor head (2) by means of a fixing device (4).

9 Claims, 4 Drawing Sheets

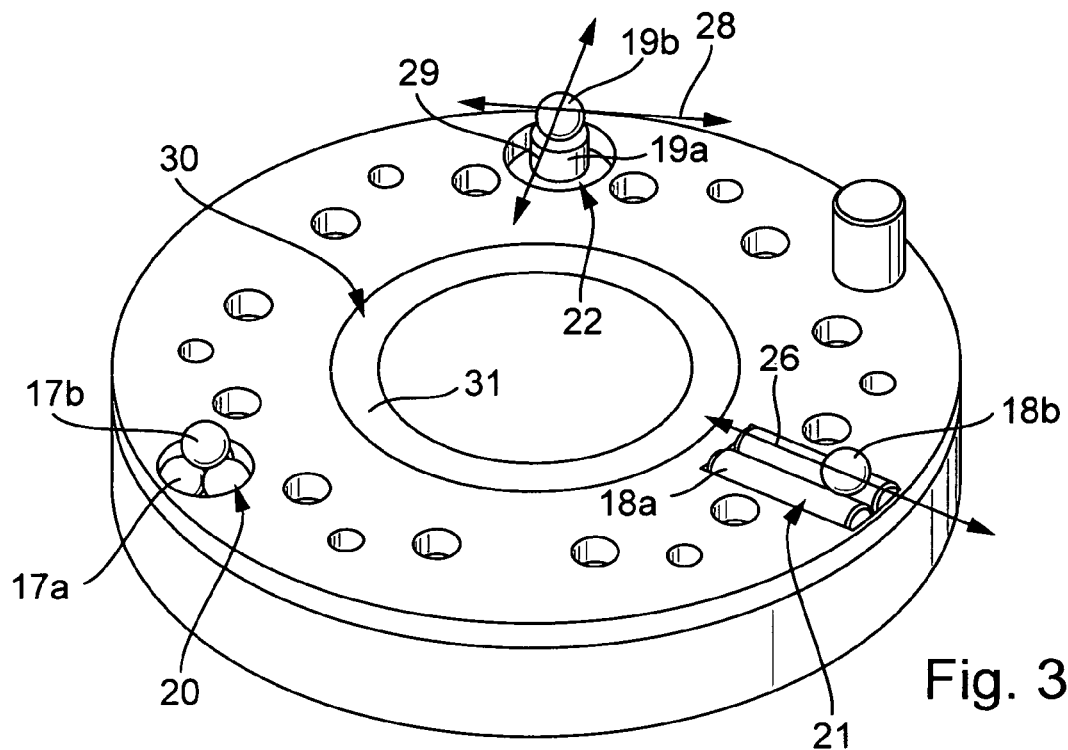
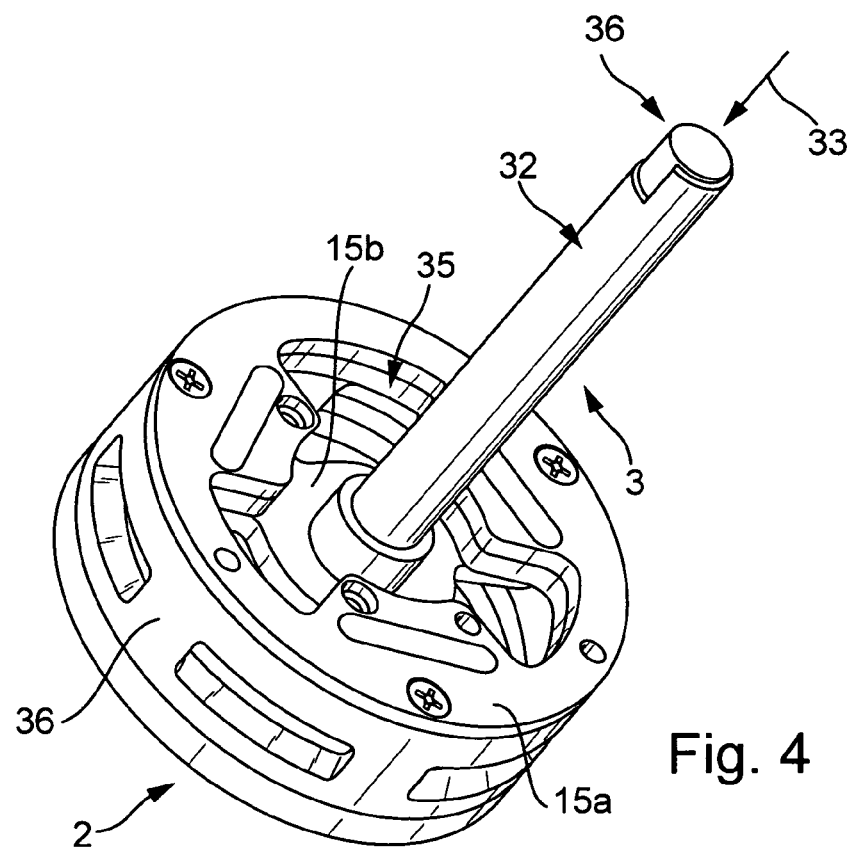

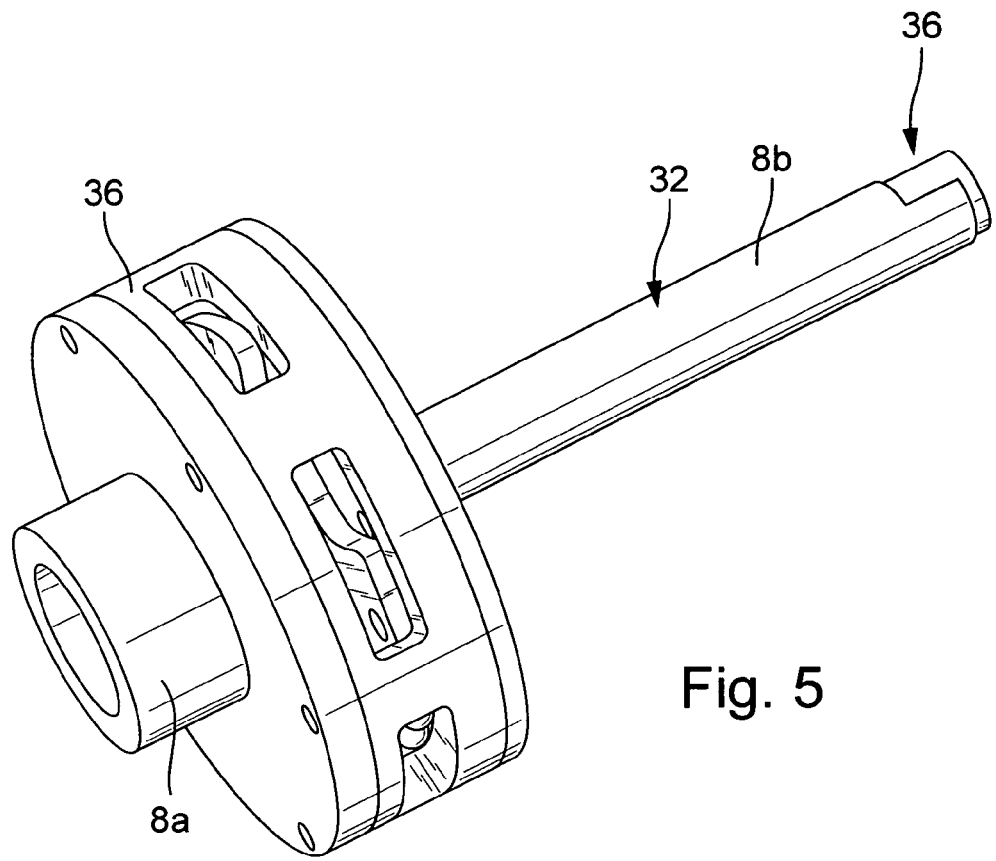
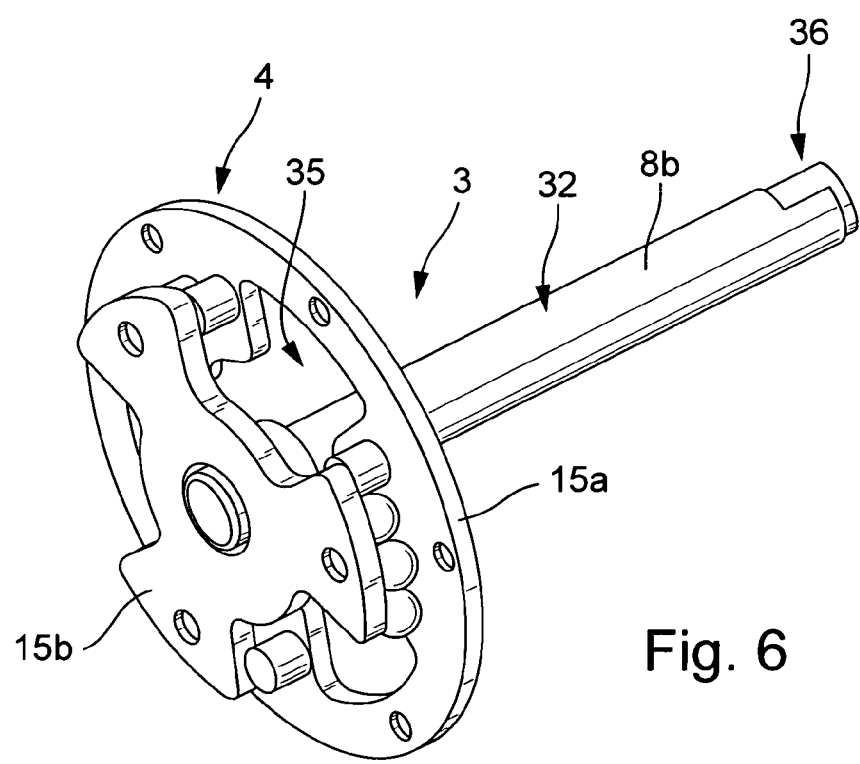

SCANNING SENSOR SYSTEM FOR NONCONTACT OPTICAL SCANNING OF OBJECT SURFACES

The invention relates to a scanning sensor system for noncontact optical scanning of object surfaces.

The task of precisely scanning the surface of an object arises in numerous areas of application. The term "to scan" is to be understood here generally in the sense that it relates to any method in which a plurality of measured points are obtained on a surface in order to obtain information about its shape in space. In particular, it involves probing of the exact dimensions of an object ("dimensional examining") but also of structural properties of the surface, for example, its roughness. Surface scanning can also include investigation of a thin near-surface layer of an object into which light penetrates.

Various optical scanning sensor systems are known. Their function can, for example, be based on image processing. In this case, the object to be measured is illuminated by means of a special illumination technique and observed by means of video technology, the results being evaluated by means of image processing software and converted into the desired dimensional information. Laser distance sensors are also known (EP 1 580 521 A2) and are in particular recommended for rapid measurement of the flatness of the object to be measured and for measurement of free-form surfaces having a low degree of curvature.

The present invention relates in particular to optical scanning sensor systems using low-coherence interferometry. In this technology, the distance scanning (obtaining highly precise information about the distance between the sensor head and the object surface) is accomplished by dividing light from a low-coherence (spectrally broad-band emitting) light source into two light paths, a measurement light path leading to the surface being scanned and a reference light path, and by combining the two partial light paths, before they impinge upon the detector, in such a manner that they interfere with one another. In the English literature, methods where distance scanning is carried out by means of low-coherence interferometry are also designated as "low coherence distance scan" (LCDS). Such methods and corresponding equipment are known, various aspects being described in WO 03/073041 A1, WO2005/088241 A1, and in the International Patent Application PCT/EP2006/011586. The content of these documents is hereby incorporated into the present application by reference.

To allow flexible adaptation of the scanning sensor system to different requirements, it is advantageous to provide a plurality of different optics units, which can be exchangeably attached to a base part, here designated as sensor head. Even if the system does not comprise a variety of optics units, an exchangeable attaching is advantageous, particularly for easy exchange in the event of damage. In addition, it can be desirable to design the attaching of the optics unit to the sensor head in such a manner that protection from collisions is achieved.

Exchanging the optics unit should be as simple as possible and not require tools. At the same time, extremely high requirements have to be met regarding the precision of the positioning of the optics unit relative to the sensor head. LCDS methods allow distance measurements having a precision in the submicron range. The lateral resolution (in the direction transverse to the light beam to be scanned) is a few microns. Naturally, this quality should also be retained even when an optics unit is attached exchangeably to the sensor head. Consequently, the precision of the mechanical connection between optics unit and sensor head must be better than the said values of the optical scanning.

SUMMARY OF THE INVENTION

On this basis, it is the object of the invention to provide a scanning sensor system having a sensor head and an optics unit as system components adapted to one another, wherein the optics unit, preferably a plurality of different optics units, can be connected to a sensor head as simply as possible but with a precision that does not impair the quality of the optical measurement to any substantial degree.

The object is achieved by a scanning sensor system for noncontact optical scanning of object surfaces having a sensor head and an optics unit as system components adapted to one another, the optics unit being able to be attached and positioned with high precision on the sensor head by means of a fixing device, the fixing device comprising a pressing-on device which presses the optics unit toward the sensor head, the fixing device having three bearings, on which an optics unit pressed against the sensor head can be borne and thereby positioned, each of the three bearings having a pair of bearing parts matched to one another in respect of their shape and positioning, these bearing parts having bearing surfaces in which respectively one of the bearing parts of the bearing part pairs is in contact with at least one bearing surface of the other bearing part of the bearing part pair, respectively one bearing part of the bearing part pairs is fixed to the optics unit and the other bearing part of the bearing part pairs is fixed to the sensor head, and the bearing part pairs are configured in such a manner that they effect different movement restrictions for a lateral movement of the respectively one bearing part of the bearing part pair relative to the respectively other bearing part of the bearing part pair in the lateral direction, relative to a plane running through the bearing, namely

- a first bearing part pair allows no lateral movement,
- a second bearing part pair allows only a linear lateral movement in one spatial direction, and
- a third bearing part pair allows a two-dimensional lateral movement in two spatial directions.

The invention achieves a fastening of the optics unit to the sensor head which is constructively simple and allows easy handling. In particular, small mechanical tolerances cannot lead to any overdetermining of the positioning, which could cause wobbling of the measurement unit relative to the sensor head. Such overdetermination could possibly be compensated by very strong pressing-on forces and a resulting deformation of the components in contact with one another. However, the precision of the fastening is thereby impaired and the aim of easy (if possible, without tools) handling is not achieved.

It is known from DE 3834117 A1 to use bearing part pairs in a scanning sensor system at a separation point between a sensor head and an optics unit, these bearing part pairs allowing only one lateral movement in one spatial direction, each being formed by one cylinder rod and one pair of balls. In this document a similar construction is also used to protect against collisions. This system suffers from the previously mentioned problem of overdetermination. The slightest manufacturing tolerances can have the result that only two of the three cylinders contact the respective ball pairs. This results in an angular error.

BRIEF DESCRIPTION OF THE DRAWINGS

The invention is explained in detail hereafter with reference to exemplary embodiments shown in the figures. The features shown therein can be used singly or in combination to provide preferred embodiments of the invention. In the figures:

FIG. 3 shows a perspective oblique view of a fixing flange to explain the geometrical conditions relevant to the invention;

FIG. 4 shows a perspective view of an alternative fixing device of a scanning sensor system according to the invention;

FIG. 5 shows a perspective view of the system of FIG. 4 from a different viewing angle;

FIG. 6 shows a view similar to FIG. 5 after removing a housing part.

DETAILED DESCRIPTION

Figure 1:
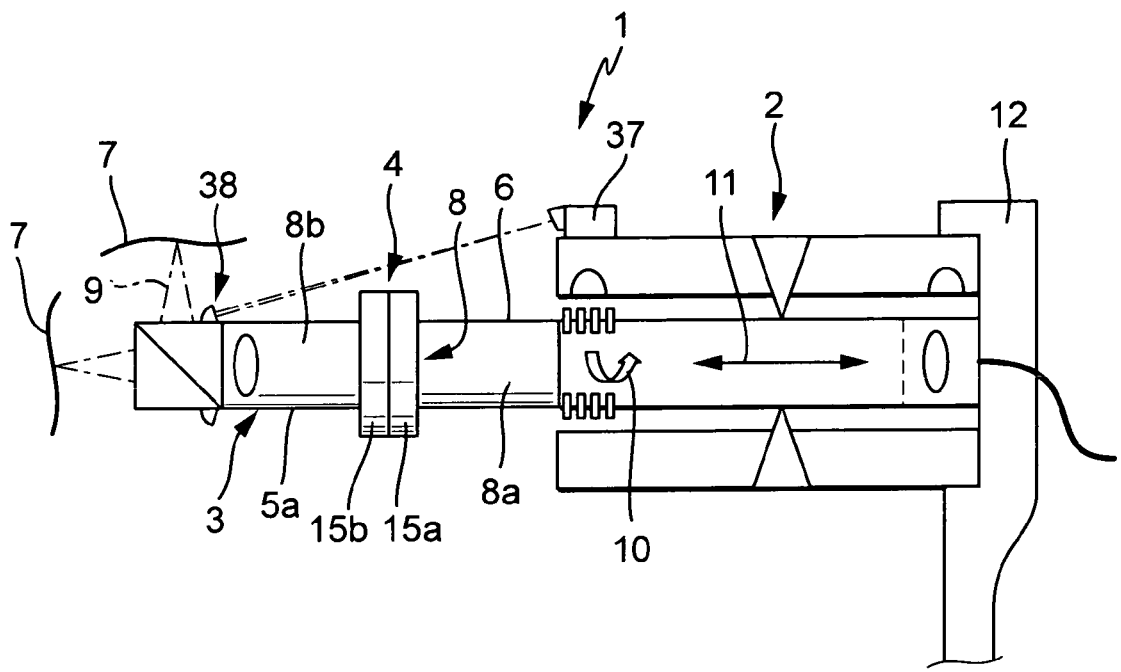
FIG. 1 shows a schematic side view of a scanning sensor system with a sensor head and three different optics units, which can be connected interchangeably to the sensor head.
Figure 1:
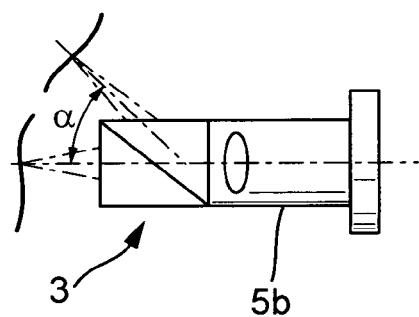
Figure 1:
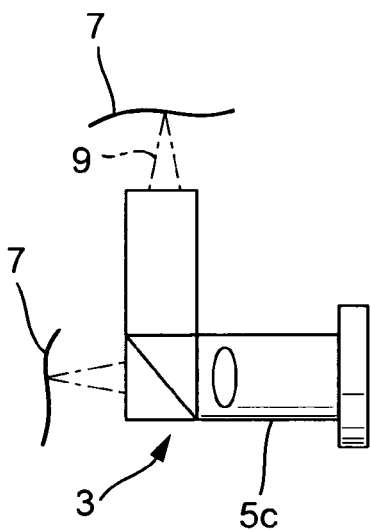

The scanning system 1 shown in FIG. 1 consists of a base part designated as sensor head 2 and an optics unit 3, which can be attached to the sensor head 2 by means of a fixing device 4. In the case shown, the optics unit 3 is available in three different embodiments, which are designated 5a, 5b, and 5c and allow adaptation to the various requirements occurring in scanning of an object surface 7.

The sensor head shown in FIG. 1 corresponds to WO 2007/079837. It allows a rotation (arrow 10) and an axial movement (arrow 11) of a scanning module 6 having a front end formed by the optics unit 3. The movements of the scanning module 6 allow to move a scanning light beam 9 over the object surface 7.

FIG. 1 illustrates that the sensor system 1 can be adapted to different scanning tasks by changing the optics unit. For example, the optics unit 5a makes it possible to scan two object surfaces running substantially perpendicular to each other while the optics unit 5b provides the same possibility for object surfaces inclined obliquely to one another. The optics unit 5c, like the optics unit 5a, is suitable for scanning surfaces running perpendicular to each other, but with a larger lateral distance of the lateral object surface.

When the scanning sensor system shown in FIG. 1 is positioned in a stationary manner, it is suitable for scanning a relatively narrow spatial area on a stationary object or on an object, which is moved past the scanning sensor system. If larger surface areas are to be scanned, the scanning sensor system can be attached to a positioning device, for example, to a coordinate measuring machine or to a positioning robot. FIG. 1 only shows a holder 12 of such a positioning device provided for attaching the scanning sensor thereto.

So far, the scanning sensor system shown in FIG. 1 has no particular features relevant to the present invention. Reference can be made to the documents already cited with regard to further details.

The feature of the scanning sensor system shown in FIG. 1 which is particular to the invention, relates to the fixing device which connects the optics unit to the sensor head. Particularly relevant are cases of application where, as in the case shown, an optical channel 8 guiding the measuring light beam used for the scanning by means of free-beam optics, consists of two partial sections, a first partial section 8a which is a component of the sensor head 2 and a second partial section 8b which is a component of the optics unit 3. With such a design, even small changes in the positioning of the two partial sections 8a, 8b of the optical channel, relative to one another, cause measurement inaccuracies. It must therefore be ensured that the structural elements defining the partial sections 8a and 8b of the beam path inside the sensor system 1 are fixed to each other reproducibly with the highest precision of positioning.

Figure 2:
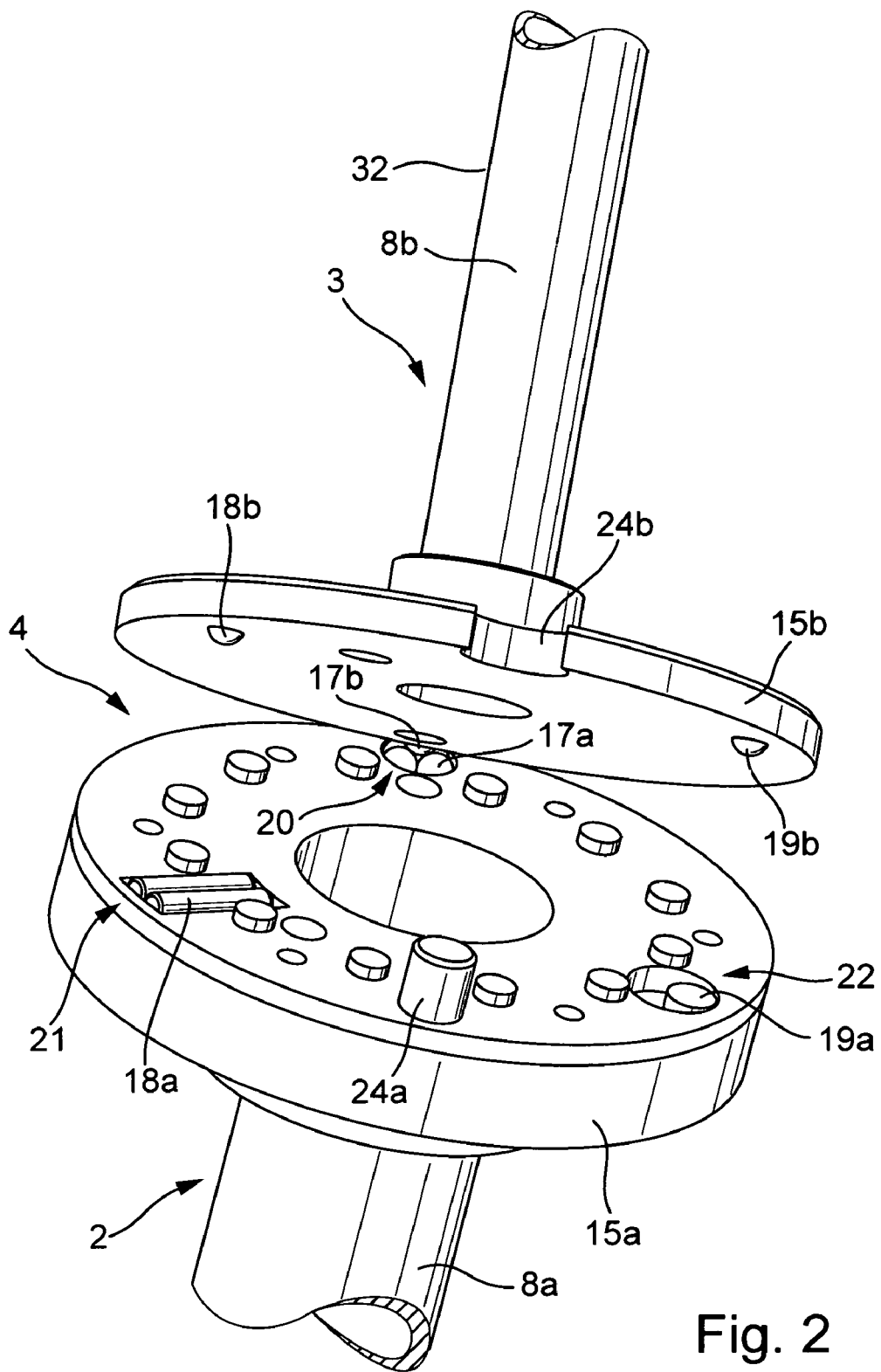
FIG. 2 shows a perspective side view of the fixing device of a scanning sensor system according to the invention.

FIGS. 2 and 3 show an embodiment of the fixing device which meets these requirements. The two partial sections 8a, 8b of the optical channel 8 to be connected to one another each have fixing flanges 15a, 15b at their ends facing one another, said flanges extending in radial direction from the axis of the optical channel 8. Each of the fixing flanges 15a, 15b has three bearing parts 17a, 18a, 19a or 17b, 18b, 19b, each forming, in the assembled state of the system parts 2 and 3, a bearing 20, 21, 22. The optics unit 3 is borne and positioned by means of the three bearings 20, 21, 22 when it is pressed in the axial direction toward the sensor head 2.

When placing the optics unit 3 on the sensor head 2, geometric indexing parts ensure the correct rotational position, only allowing the two fixing flanges 15a, 15b to be placed together in a single rotational position. In the case shown, these indexing parts 24a, 24b are formed by a cylindrical pin fitted to one of the fixing flanges 15a and by a corresponding recess in the other flange part 15b.

It is essential for the function of the fixing device that the bearing part pairs 17a, 17b; 18a, 18b; and 19a, 19b effect different movement restrictions for a lateral movement of one bearing part of the bearing part pair relative to the other bearing part of the bearing part pair in the lateral direction, with reference to the bearing plane running through the bearings 20, 21, 22. These movement restrictions result from the shapes of the bearing surfaces contacting one another, as will be explained hereafter with reference to FIG. 3.

In each of the bearing part pairs shown in FIGS. 3 and 4, one bearing part has a single bearing surface, which is spherically curved in the case shown. FIG. 3 shows the bearing parts 17b, 18b and 19b as complete spheres. Naturally however, only those partial surfaces of the bearing parts which are in contact with the other bearing part of the bearing part pair are of importance and form the respective bearing surface. FIGS. 2 and 3, for example, show hemispherical bearing parts 17b, 18b, and 19b.

The curvature need not necessarily be spherical. In particular, it is possible to have shapes of the bearing parts 17b, 18b, 19b where the bearing surface has a different (nonspherical) convex shape, the bearing surface preferably being formed as a surface of revolution having its axis of rotation running transversely to the bearing plane running through the bearings 20, 21, 22. The axis of rotation about which the generatrix of the surface of revolution rotates is preferably oriented perpendicular to the bearing plane. However, other orientations are also possible where the axis of the surface of revolution runs transversely to the bearing plane in the sense that it intersects this plane and its shape ensures the desired movement restriction in cooperation with the other bearing part of the bearing part pair.

The respectively other bearing part 17a, 18a, 19a of each of the bearing part pairs is differently configured for the three bearings 20, 21, 22 in such a manner that the desired different movement restrictions result:

a) In the case of the first bearing part pair forming the bearing 20, the other bearing part (located on the fixing flange 15a in the embodiment shown) is configured in such a manner that no lateral movement is possible in the bearing plane. In the case shown, this is achieved by three spherically curved surfaces facing the other bearing part 17b and forming bearing surfaces in contact with the bearing surface of the bearing part 17b. The desired movement restriction can also be achieved with other forms of surface of revolution, the bearing part 17a in any case preferably having three bearing surfaces which are convexly curved in the direction of the other bearing part 17b. Again, the convexly curved bearing surface is preferably a surface of revolution having its axis of rotation running in the same direction, as discussed previously, transversely to the bearing plane.

b) In the case of the second bearing 21, the other bearing part 18a is configured such that the second bearing part pair 18a, 18b only allows a linear lateral movement in the plane mentioned, this movement being symbolized by the double arrow 26. In the present case, this is achieved by the bearing part 18a having two bearing surfaces shaped as a circular cylinder with the cylinder axis running parallel to the bearing plane. Alternatively, a different shape of the bearing surfaces ensuring the desired movement restriction can also be considered. In particular bearing surfaces may be used which are convexly curved in a plane extending perpendicular to the permissible lateral movement (arrow 26) but run straight in the spatial direction of the permissible lateral movement. These comprise in particular surfaces of revolution having a straight generatrix.

c) The other bearing part 19a of the third bearing 22 is formed such that it allows two-dimensional lateral movements (arrows 28, 29), i.e., arbitrary movements within the bearing plane. In the case shown, this is achieved by a flat (coplanar with the bearing plane) bearing surface of the bearing part 19a.

The pressure required for attaching the optics unit 3 to the sensor head 2 is provided by a pressing-on device designated as a whole by 30, preferably comprising a magnet which is fixed to one of the system parts, i.e. to the optics unit 3 or the sensor head 2, in the area of the fixing device. For example, as shown in FIG. 3, a permanent magnet 31 (annular in the case shown) can be inserted into one of the flanges 15a or 15b. The opposing system part must consist of a magnetic material so that it is pulled toward this permanent magnet. Two permanent magnets having unlike poles facing one another are preferably used.

In the embodiment shown in the figures, as has already been explained, the bearing parts 17b, 18b, 19b of the optics unit 3 are not located directly on the housing part surrounding the optical channel 8b (i.e. the measuring needle 32 shown in FIGS. 2 and 4 to 6) but on the flange 15b, which extends radially outward from the axis of the optical channel 8b running in the optics unit 3. This causes a greater radial distance from the optical axis which results in a more stable fixing, particularly with regard to the angular deviation between the optical axis in the channel 8b of the optics unit 3 and the optical axis in the channel 8a in the sensor head 2. The distance of the bearing parts 17b, 18b, 19b (more accurately the shortest distance of a bearing surfaces of these bearing parts) from the axis of the optical channel 8b should be at least 5 mm, preferably at least 10 mm, and particularly preferably at least 15 mm.

An additional advantage of the fixing device described with reference to FIGS. 2 and 3 is that it provides collision protection if the measuring needle 32 (only shown in FIG. 2) forming the optical channel 8b in the area of the optics unit 3 collides during operation with any elements in its vicinity. The fastening with the aid of a detachable, preferably magnetic, pressing-on force and the described bearings 20 to 22 ensures that in the event of a lateral impact against the measuring needle 32, the optics unit 3 makes a tilting movement (roughly as shown in FIGS. 2 and 3) in which it becomes detached from the sensor head 2. This protection from collisions can avoid any damage to the optics unit 3 and in particular, the measuring needle 32.

In the embodiment shown in FIGS. 2 and 3, however, no collision protection is provided for impacts acting in the axial direction on the measuring needle 32 from the front, i.e., in the direction symbolized by the arrow 33 in FIG. 4. FIGS. 4 to 6 show a design which provides collision protection even for this case. FIGS. 5 and 6 show a fixing device 4 in the mounted state while in FIG. 7 a housing part has been removed to make the functional parts in the interior more clearly visible.

In the design shown in FIGS. 4 to 6, the fixing device 4 again has two fixing flanges 15b and 15a, which are part of the optics unit 3 or the sensor head 2. In this case, however, the fixing flange 15b of the optics unit 3 and the fixing flange 15a of the sensor unit 2 are configured in such a manner that the former can be inserted through a central recess 35 in the latter. In the assembled state of the system components 2, 3, the flange 15b of the optics unit 3 is located further backwards in the axial direction (that is, further away from the free end 36 of the optics unit 3) than the flange 15a of the sensor head 2. This has the consequence that the section 8b of the optical channel 8 which is a part of the optics unit 3 runs through a recess 35 of the flange 15a. The flange 15a is connected to a (cage-like) housing part 34 embracing the flange 15b, which makes the mechanical connection to the sensor head 2, that is, to the structural elements forming the optical channel 8a.

The bearings 20, 21, 22 are configured similarly to FIGS. 2 and 3 but are provided on the respectively other side of the flanges 15a or 15b. The bearing parts of the optics unit 3 are consequently located on the front side (facing the free end 36 of the needle 32) of the flange 15b while the bearing parts of the sensor head are located on the rear side of the flange 15a, that is facing the sensor head.

If, in the embodiment shown in FIGS. 4 to 6, the measuring needle 32 experiences an axial impact from the front in the direction of the arrow 33, the optics unit 3 can detach from the sensor head 2 so as to also avoid any damage in the event of such an axial impact.

According to a preferred embodiment a light barrier is used to detect a collision, said light barrier detecting the movement of the optics unit 3 resulting from the collision. As shown in FIG. 1, a corresponding light barrier device 37 can be attached to the fixed (nonrotating) part of the sensor unit 2. The light beam of the light barrier device 37 (for example, operating according to the reflection method) is directed toward the front (free) end 36 of the optics unit 3 and configured in such a manner that it detects any movement of the optics unit caused by a collision. A mirror ring 38 which is rotationally symmetrical to its axis of rotation can be provided for this purpose on the optics unit 3.

Naturally, the previously explained embodiments can be modified in many respects without departing from the inventive teaching. The following gives examples of possible modifications which, however, are not to be understood as limiting in any way:

The components forming the optical channel 8 with its sections 8a and 8b are shown as closed tubes in the figures. This is not always necessary. In particular, if interference from external light is not a factor in the selected optical scanning method, an open design of the optical channel is also possible.

The same applies to the flanges, which naturally can also be configured as interrupted, for example, as a grid-like structure. The external shape of the flanges can (as shown in FIGS. 4 to 6, for example) also be configured differently.

As follows from the examples which have been explained, the term bearing part is not to be understood in that it comprises a discrete component. Rather, the term designates in each case a part of the bearing 20, 21, 22 located on the optics unit or on the sensor in head. Depending on the specific design, each of the bearing parts can consist of a plurality of separate elements but can also be formed integrally on the optics unit or the sensor head (in particular on its fixing flanges). The crucial thing is that the bearing parts cooperate so that the defined restrictions are achieved.

What is claimed is:

1. Scanning sensor system for noncontact optical scanning of object surfaces, the system comprising, as mutually adapted system components, a sensor head (2) and an optics unit (3), wherein
   the optics unit (3) can be attached and positioned with high precision on the sensor head (2) by means of a fixing device (4),
   the fixing device (4) comprises a pressing-on device (30) which presses the optics unit (3) toward the sensor head (2),
   the fixing device (4) comprises three bearings (20, 21, 22), by which an optics unit (3) pressed against the sensor head (2) is borne and thereby positioned,
   each of the three bearings (20, 21, 22) comprises a pair of bearing parts (17a, 17b; 18a, 18b; 19a, 19b) adapted to one another with respect to their shape and positioning, the bearing parts having bearing surfaces in which one of the bearing parts (17a, 18a, 19a) of each of said bearing part pairs is in contact with at least one bearing surface of the other bearing part (17b, 18b, 19b) of said bearing part pair,
   one bearing part (17b, 18b, 19b) of each bearing part pair is located at the optics unit (3) and the other bearing part (17a, 18a, 19a) of said bearing part pair is located at the sensor head (2), and
   the bearing part pairs are configured in such a manner that they effect different restrictions of lateral movements of one bearing part (17a, 18a, 19a) of the bearing part pair relative to the other bearing part (17b, 18b, 19b) of the bearing part pair in the lateral direction, relative to a plane running through the bearings (20, 21, 22), namely that:
   a first bearing part pair (17a, 17b) allows no lateral movement,
   a second bearing part pair (18a, 18b) allows only a linear lateral movement in one spatial direction, and
   a third bearing part pair (19a, 19b) allows a two-dimensional lateral movement in two spatial directions.

2. System according to claim 1, wherein one of the bearing parts (17b, 18b, 19b) of each bearing part pair has a convexly curved bearing surface, in particular a bearing surface formed as a surface of revolution with an axis of rotation running transversely, preferably perpendicularly to the plane running through the bearings (20, 21, 22).

3. System according to claim 1 wherein one of the bearing parts (17a) of the first bearing part pair has three convexly curved bearing surfaces, in particular bearing surfaces formed as surfaces of revolution with axes of rotation running transversely, preferably perpendicularly to the plane running through the bearings (20, 21, 22).

4. System according to claim 1 wherein one of the bearing parts (18a) of the second bearing part pair has two bearing surfaces which are convexly curved only in one plane, in particular surfaces of revolution having a straight generating line.

5. System according to claim 1 wherein one of the bearing parts (19a) of the third bearing part pair has a flat bearing surface.

6. System according to claim 1 wherein the pressing-on device (30) for producing a retaining force acting between the sensor head and the optics unit comprises at least one magnet (31), which is located at one of the system parts (2, 3) in the vicinity of the fixing device (4).

7. System according to claim 1 wherein the bearing parts (17b, 18b, 19b) of the optics unit (3) are located at a fixing flange (15b) of the optics unit (3), the fixing flange extending radially outward from an optical channel (8b).

8. System according to claim 7, wherein the bearing surfaces of the bearing parts (17b, 18b, 19b) of the optics unit (3) from the axis of an optical channel (8b) running in the optics unit (3) is at least 5 mm, preferably at least 10 mm, and particularly preferably at least 15 mm.

9. System according to claim 7, wherein in order to protect against impacts on the free end (36) of the optics unit (3) in the direction of its longitudinal axis (arrow 33),
   the sensor head (2) has a fixing flange (15a) with a central recess (35),
   the fixing flange (15b) of the optics unit (3) is configured so that it can be passed through the central recess (35) of the fixing flange (15a) of the sensor head (2) for attaching the optics unit (3) on the sensor head (2), so that in the joined state of the optics unit (3) and the sensor head (2), the fixing flange (15b) of the optics unit (3) is located on the rear side of the fixing flange (15a) of the sensor head (2) facing away from the free end (36) of the optics unit (3),
   the bearing parts (17b, 18b, 19b) of the optics unit (3) are located on the front side of the fixing flange (15b) of the optics unit (3) facing its free end, and
   the bearing parts (17a, 18a, 19a) of the sensor head (2) are located on the rear side of the fixing flange (15a) of the sensor unit (2) facing away from the free end of the optics unit (3).

* * * * *